(12) United States Patent
Prager et al.

(10) Patent No.: US 8,656,391 B2
(45) Date of Patent: Feb. 18, 2014

(54) SYSTEM AND METHOD FOR INITIATING THE EXECUTION OF A PROCESS

(75) Inventors: Scott H. Prager, Stratham, NH (US); Martin T. Moore, Somerville, MA (US); Charles R. Hill, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 1549 days.

(21) Appl. No.: 11/767,023

(22) Filed: Jun. 22, 2007

(65) Prior Publication Data

US 2009/0007113 A1 Jan. 1, 2009

(51) Int. Cl.
*G06F 9/46* (2006.01)

(52) U.S. Cl.
USPC ........... 718/100; 718/101; 718/102; 718/104; 718/106

(58) Field of Classification Search
USPC .......... 718/100, 101, 102, 104, 106; 707/706, 707/723, 732
See application file for complete search history.

(56) References Cited

U.S. PATENT DOCUMENTS

| | | | |
|---|---|---|---|
| 6,065,009 A | 5/2000 | Leymann et al. | |
| 6,381,579 B1 * | 4/2002 | Gervais et al. | 705/7.13 |
| 7,062,537 B2 | 6/2006 | Aziz et al. | |
| 7,296,223 B2 * | 11/2007 | Chidlovskii et al. | 715/234 |
| 7,793,040 B2 * | 9/2010 | Bittner, Jr. | 711/108 |
| 7,814,405 B2 * | 10/2010 | Kumar et al. | 715/201 |
| 2004/0123242 A1 * | 6/2004 | McKibben et al. | 715/513 |
| 2007/0244892 A1 * | 10/2007 | Narancic | 707/7 |
| 2007/0250810 A1 * | 10/2007 | Tittizer et al. | 717/110 |
| 2008/0016072 A1 * | 1/2008 | Frieden et al. | 707/7 |
| 2008/0040362 A1 * | 2/2008 | Aucouturier et al. | 707/100 |
| 2008/0126990 A1 * | 5/2008 | Kumar et al. | 715/835 |
| 2008/0168449 A1 * | 7/2008 | Rice et al. | 718/102 |
| 2008/0235194 A1 * | 9/2008 | Shima et al. | 707/3 |
| 2009/0064282 A1 * | 3/2009 | Li | 726/4 |
| 2009/0089322 A1 * | 4/2009 | Naaman | 707/103 R |

OTHER PUBLICATIONS

Vargas-vera et al. "MnM: Ontology Driven Semi-Automatic and Automatic Support for Semantic Markup (2002)" EKAW 2002, LNAI 2473, pp. 379-391.*

Li et al. "Predicting individual priorities of shared activities using support vector machines", Nov. 6-8, 2007, ACM, CIKM '07 Proceedings of the sixteenth ACM conference on Conference on information and knowledge management , pp. 515-524.*

Glance, et al., "Generalized Process Structure Grammars (GPSG) for Flexible Representations of Work", Computer Supported Cooperative Work, 1996, pp. 180-189, ACM 0-89791-765-0/96/11, Cambridge MA USA.

Geyer, et al., "Activity Explorer: Activity-centric collaboration from research to product", IBM Systems Journal 45-4, pp. 1-26, Business Collaboration, Published online Oct. 16, 2006.

(Continued)

*Primary Examiner* — Emerson Puente
*Assistant Examiner* — Willy W Huaracha
(74) *Attorney, Agent, or Firm* — Holland & Knight LLP; Brian J Colandreo Esq.; Jeffrey T Placker Esq.

(57) ABSTRACT

A method and computer program product for defining a plurality of tags, each of which is associated with a discrete process executable on activity content. At least one of the plurality of tags is associated with a piece of content within an activity, thus defining one or more associated tags.

16 Claims, 5 Drawing Sheets

(56) References Cited

OTHER PUBLICATIONS

Vaughan, "Activity-centric collaboration tools on Lotusphere menu", pp. 1-4, Published online Jan. 23, 2005 @ SearchDomino.com.
Sebastian, "Activity-Centric Collaboration: What's Next? Level: Intermediate", 22 DNUG Conference > 2. Conference Day Jun. 15, 2005 > Forum 1: Technology, IBM Corporation @ http://www.ibm.com/software.
Roller, et al., "Context-based Selection of Activity Implementations in Workflow Management Systems", RD n446 Article 1 (Jun. 2001), pp. 1-3.

* cited by examiner

SYSTEM AND METHOD FOR INITIATING THE EXECUTION OF A PROCESS

TECHNICAL FIELD

This disclosure relates to tagging and, more particularly, to using tags as triggers that initiate the processing of data.

BACKGROUND

Activity-centric computing provides a way of working collaboratively, focused around the goal at hand rather than on specific tools/defined workflow processes. By leveraging a set of characteristics of an activity-centric computing system, lightweight workflow processes may be created on-the-fly and as a result of natural work activities. This may provide a method of collaborating/completing/connecting processes that is more natural for the layman than existing workflow software.

Specifically, existing methodologies may either be based on predefined processes (i.e., which are generally process-centric or document-centric, as opposed to activity-centric) or are fully informal (i.e., requiring the people involved to determine the correct flow and access control at each step); each of which has its drawbacks.

SUMMARY OF DISCLOSURE

In a first implementation, a method includes defining a plurality of tags, each of which is associated with a discrete process executable on activity content. At least one of the plurality of tags is associated with a piece of content within an activity, thus defining one or more associated tags.

One or more of the following features may be included. In response to associating at least one of the plurality of tags with the piece of content within the activity, the discrete process associated with the one or more associated tags may be executed on the piece of content within the activity. The tags may be semantic tags. The tags may include metadata.

The piece of content may be associated with the activity. Associating the piece of content with the activity may initiate associating at least one of the plurality of tags with the piece of content within the activity.

The tags may be chosen from the group consisting of: milestone tags, input tags, output tags, reporting tags, storage tags, backup tags, notification tags, deadline tags, and critical tags.

One or more supplemental tags may be added to the plurality of tags. A discrete process executable on activity content may be associated with each of the one or more supplemental tags. One or more of the plurality of tags may be deleted.

In another implementation, a computer program product resides on a computer readable medium that has a plurality of instructions stored on it. When executed by a processor, the instructions cause the processor to perform operations including defining a plurality of tags, each of which is associated with a discrete process executable on activity content. At least one of the plurality of tags is associated with a piece of content within an activity, thus defining one or more associated tags.

One of more of the following features may be included. In response to associating at least one of the plurality of tags with the piece of content within the activity, the discrete process associated with the one or more associated tags may be executed on the piece of content within the activity. The tags may be semantic tags. The tags may include metadata.

The piece of content may be associated with the activity. Associating the piece of content with the activity may initiate associating at least one of the plurality of tags with the piece of content within the activity.

The tags may be chosen from the group consisting of: milestone tags, input tags, output tags, reporting tags, storage tags, backup tags, notification tags, deadline tags, and critical tags.

One or more supplemental tags may be added to the plurality of tags. A discrete process executable on activity content may be associated with each of the one or more supplemental tags. One or more of the plurality of tags may be deleted.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
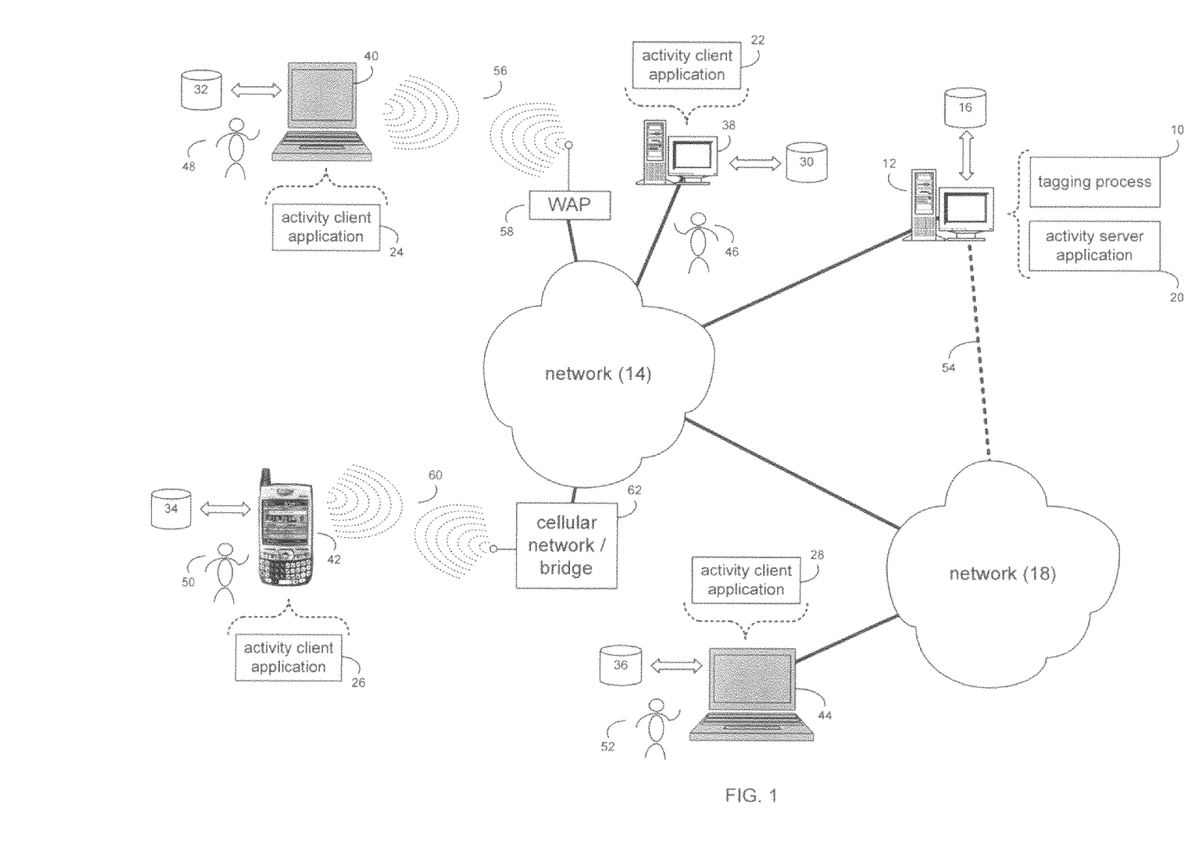
FIG. 1 is a diagrammatic view of a tagging process, an activity server application, and an activity client application coupled to a distributed computing network.

System Overview:

Referring to FIG. 1, there is shown tagging process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, tagging process 10 may define a plurality of tags, each of which may be associated with a discrete process executable on activity content. At least one of the tags may be associated with a piece of content (e.g., a document, a report or an email) within an activity and the discrete process (associated with the tag) may be executed with respect to the associated piece of content.

The instruction sets and subroutines of tagging process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute activity server application 20, examples of which may include but are not limited to Lotus Connections Activities™ available from the International Business Machines Corporation of Armonk, N.Y. Activity server application 20 may allow an administrator/user to define, regulate and participate in activities (to be discussed below in greater detail) across a network and may interface with one or more activity client applications 22, 24, 26, 28, examples of which may include but are not limited to Lotus Connections Activities web client™ available from the International Business Machines Corporation of Armonk, N.Y. Tagging process 10 may be a stand alone application that interfaces with activity server application 20 or an applet/application that is executed within activity server application 20.

The instruction sets and subroutines of activity server application 20, which may be stored on storage device 16 coupled to server computer 12 may be executed by one or more processors (not shown) and one or more memory architectures (not shown) incorporated into server computer 12.

The instruction sets and subroutines of activity client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42. notebook computer 44, a data-enabled, cellular telephone (not shown), and a dedicated network device (not shown), for example. Using activity client applications 22, 24, 26, 28, users 46, 48, 50, 52 may access activity server application 20 and may define, regulate and participate in activities (to be discussed below in greater detail).

Users 46, 48, 50, 52 may access activity server application 20 directly through the device on which the activity client application (e.g., activity client applications 22, 24, 26, 28) is executed, namely client electronic devices 38, 40, 42, 44, for example. Users 46, 48, 50, 52 may access activity server application 20 directly through network 14 or through secondary network 18. Further, server computer 12 (i.e., the computer that executes activity server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
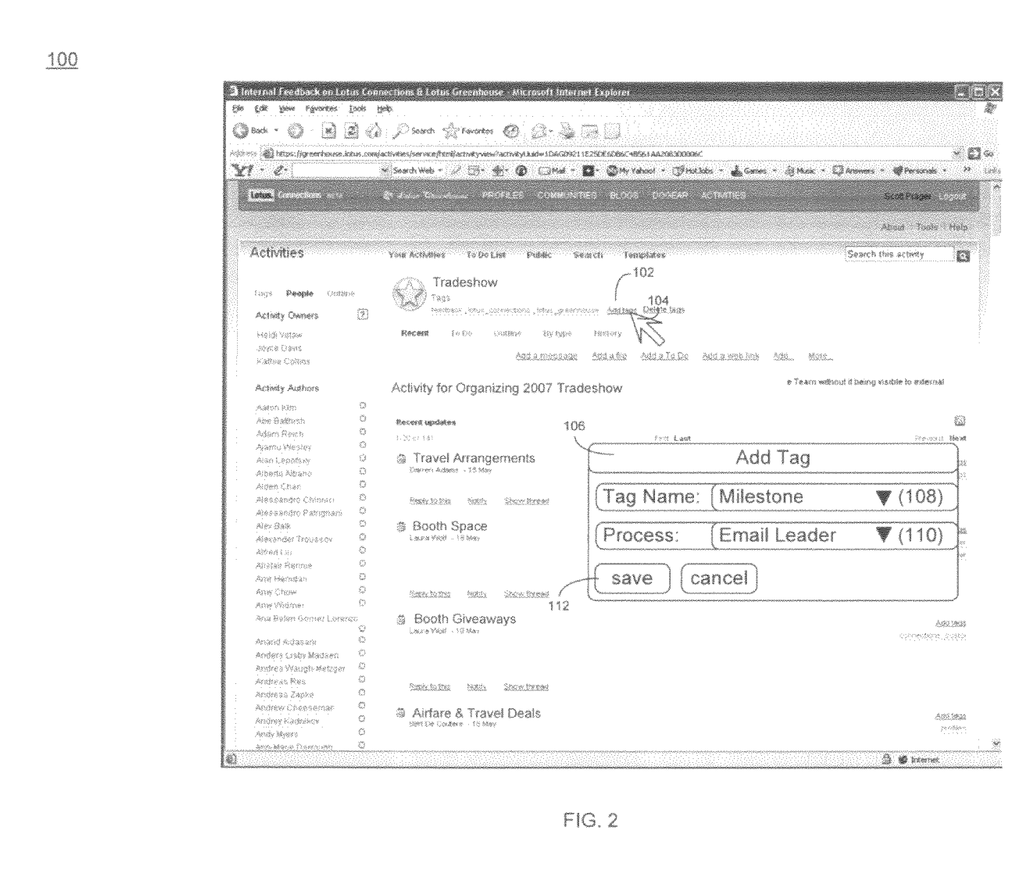
FIG. 2 is a diagrammatic view of a display screen rendered by the tagging process, activity server application and/or activity client application of FIG. 1;.

The Tagging Process:

Referring also to FIG. 2, an activity client application (e.g., activity client application 22) alone or in combination with tagging process 10/activity server application 20 may generate display screen 100. As discussed above, the activity client application (e.g., activity client application 22) may interface with activity server application 20 and may allow users to define, regulate and participate in activities.

An activity may be a collaborative event in which multiple users collaborate to achieve a common goal. For example, an activity may concern the attendance of Company X at a tradeshow. Specifically, this activity may include a plurality of discrete tasks, such as securing booth space at the tradeshow so that Company X may exhibit their goods/services. Additionally, Company X may need to make travel arrangements, arrange for the shipping of booth backdrops, platforms and tables. Further, Company X may need to have signage created and may need to obtain trinkets for giving to visitors of their booth.

Accordingly, Company X attending a tradeshow may be an activity that include a plurality of discrete tasks. As would be expected, each of these discrete tasks may be performed by different individuals (or different groups of individuals). However, in order to increase efficiency, it may be desirable for each individual (or group of individuals) to know what the other individuals (or groups of individuals) are doing. For example, tradeshow attendees may need to know about the travel arrangements, and the individuals making the signage may need to know about the size of the booth secured.

Accordingly, activity content is typically shared amongst the individuals associated with the activity. For example, the individuals securing booth space may communicate with the producer of the tradeshow and secure the booth space via email messages. Therefore, once the booth space is secured, the various email messages may be associated with the activity, thus confirming to the people involved with the activity that the booth space was secured. Additionally, the individuals creating the signage may associate drafts of the signage with the activity, thus allowing others associated with the activity to review the signage drafts. Accordingly, during the course of an activity, various pieces of activity content (e.g., documents, reports, email messages, slideshows, graphical images, spreadsheets, receipts, and travel itineraries) may be associated with an activity and, thus, made available for review/comment/revision by others associated with the activity.

As will be discussed below in greater detail, tagging process 10 may allow a user to define a plurality of tags, each of which may be associated with a discrete process executable on activity content. As activity content is associated with an activity, one or more of the plurality of tags may be associated with the newly-associated piece of content. The associated tags may then be processed and the discrete process associated with the associated tag(s) may be executed on the newly-associated piece of content. For example, assume that a tag "report" is defined that is associated with a reporting process. If the tag "report" is subsequently associated with a piece of activity content, the reporting process may be executed on the piece of activity content.

Figure 3:
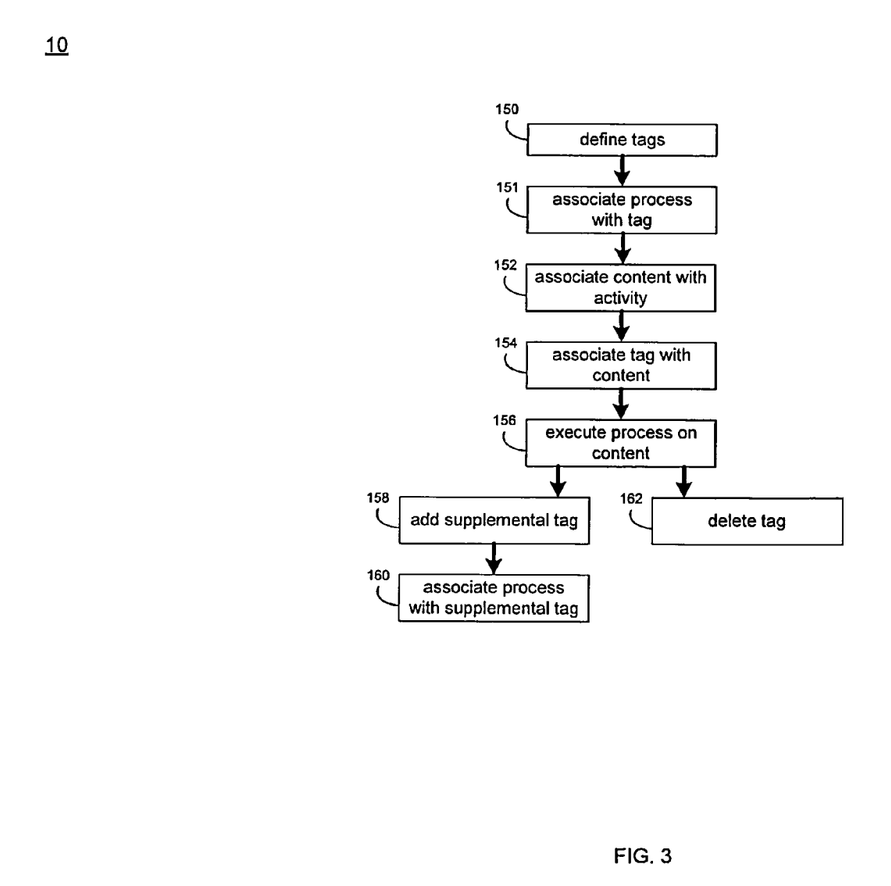
FIG. 3 is a flowchart of a process executed by the tagging process, activity server application and/or activity client application of FIG. 1.

Referring also to FIG. 3, tagging process 10, alone or in combination with activity server application 20, may allow a user to define 150 a plurality of tags, each of which may be associated 151 with a discrete process executable on activity content. For example, assume that an activity "Tradeshow" was created (e.g., by user 46) to allow for collaboration concerning the above-describe tradeshow that Company X is planning on attending. Assume that user 46 wishes to define 150 a tag "Milestone" for use within newly-created activity "Tradeshow". User 46 may select "Add tags" link 102 using onscreen pointer 104, which may be controllable by a pointing device (e.g., a mouse; not shown). Once "Add tags" link 102 is selected, tagging process 10 (alone or in combination with activity server application 20/activity client application 22) may generate popup window 106, which may include a plurality of data fields (e.g., "Tag Name" field 108 and "Process" field 110). Within "Tag Name" field 108, user 46 may specify a name for the tag being defined 150 and within "Process" field 110, user 46 may associate 151 a discrete process that may be executable on any activity content to which the newly-created tag is applied.

For example, user 46 may specify a tag name of "Milestone" (i.e., within field 108) and may associate 151 process "Email Leader" (i.e., within field 110) with tag "Milestone". One or both of fields 108, 110 may include dropdown menus (not shown) that may allow e.g., user 46 to select from a plurality of predefined tag names and/or a plurality of predefined discrete processes. For this particular example, assume that the process "Email Leader" is a predefined process that provides (via email) a copy of any activity content to which the tag "Milestone" is applied. Assuming that the leader is "Susan Smith", the "Email Leader" process may e.g., email a copy of the activity content to Susan.Smith@CompanyX.com.

This above-described example is for illustrative purposes only and is not intended to be a limitation of the disclosure. For example, the quantity and types of tags defined 150 and the quantity and types of discrete processes associated with those tags may be adjusted based upon the needs of the individuals using/administering tagging process 10 and/or activity server application 20. The tags may be metadata-based tags.

Additionally, while the system is described above as allowing the user to define 150 a tag and associate 151 a discrete process with the newly-created tag, other configuration are possible and are considered to be within the scope of this disclosure. For example, a plurality of tags may be predefined 150 and preassociated 151 within e.g., tagging process 10 and/or activity server application 20. These predefined 150 and preassociated 151 tags may be referred to as semantic tags. Accordingly, for such "predefined" tags, the user (e.g., user 46) may not need to define 150 the tag and associate 151 a discrete process with the tag.

Examples of the types to tags available tagging process 10 may include but are not limited to: milestone tags; input tags; output tags; reporting tags; storage tags; backup tags; notification tags; deadline tags; and critical tags.

Milestone tags may be associated with discrete processes that e.g., provide a copy of the associated activity content to a supervisor and/or place an entry into a project management program.

Input tags may be associated with discrete processes that e.g., may be indicative of the beginning of a task within an activity and may execute processes to e.g., secure/allocate resources required to complete the task.

Output tags may be associated with discrete processes that e.g., may be indicative of the end of a task within an activity and may execute processes to e.g., release/deallocate resources that were required to complete the task or publish a piece of content to an external content management system (e.g., Documentum™; not shown).

Reporting tags may be associated with discrete processes that e.g., email copies of various pieces of correspondence and/or run reports concerning all or a portion of an activity.

Storage tags may be associated with discrete processes that e.g., store various pieces of activity content at onsite storage facilities.

Backup tags may be associated with discrete processes that e.g., stores various pieces of content at offsite storage facilities.

Notification tags may be associated with discrete processes that e.g., provide email/hardcopy/telephonic notification to one of more designated individuals.

Deadline tags may be associated with discrete processes that e.g., provide a copy of the associated activity content to a supervisor and/or place an entry into a project management program.

Critical tags may be associated with discrete processes that e.g., provide email/hardcopy/telephonic notification to one or more designated individuals and/or place an entry into a project management program.

Tagging process 10 (alone or in combination with activity server application 20/activity client application 22) may allow a user to associate 152 a piece of content with an activity and may allow the user to associate 154 at least one of the plurality of tags with the newly-associated 152 piece of content (thus defining one or more associated tags).

Figure 4:
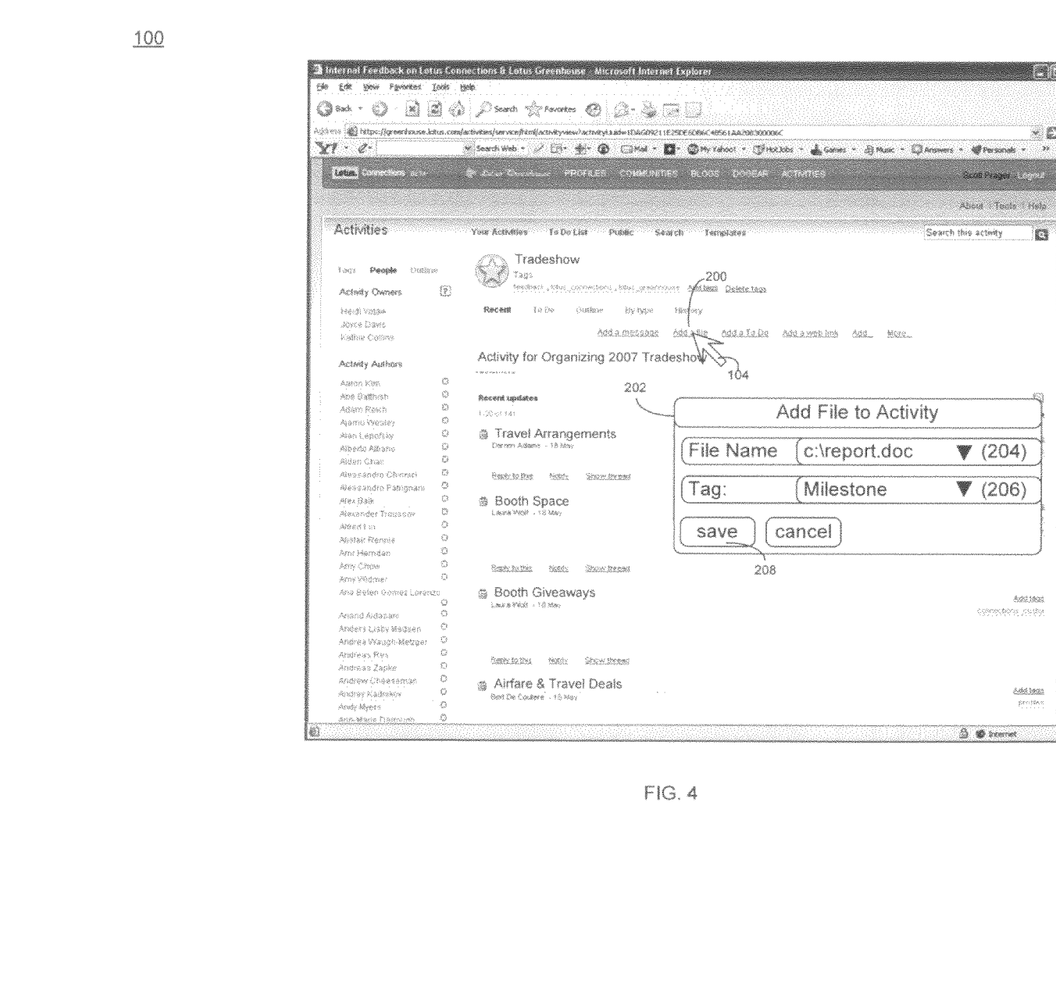
FIG. 4 is a diagrammatic view of a display screen rendered by the tagging process, activity server application and/or activity client application of FIG. 1.

For example and referring also to FIG. 4, tagging process 10 (alone or in combination with activity server application 20/activity client application 22) may allow user 46 to associate 152 content with an activity by e.g., selecting "Add a file" link 200 with onscreen pointer 104. Tagging process 10 (alone or in combination with activity server application 20/activity client application 22) may generate popup menu 202 that may include a plurality of fields (e.g., "File Name" field 204 and "Tag" field 206). One or both of fields 204, 206 may include dropdown menus (not shown) that may allow e.g., user 46 to browse for the content to be associated 152 with activity "Tradeshow" and/or to select a tag (from a plurality of predefined tags) to be associated 154 with the content.

Within "File Name" field 204, user 46 may define the piece of content (e.g., "c:\report.doc") to be associated 152 with e.g., activity "Tradeshow". Within "Tag" field 206, user 46 may define the tag (e.g., "Milestone") to be associated 154 with the newly-associated 152 piece of content (e.g., "c:\report.doc"). Once fields 204, 206 are populated, user 46 may select "save" button 208 using e.g., onscreen pointer 104, resulting in content "c:\report.doc" being associated 152 with activity "Tradeshow" and tag "Milestone" being associated 154 with content "c:\report.doc".

Tagging process 10 (alone or in combination with activity server application 20/activity client application 22) may execute 156 the discrete process associated with the associated tag on the newly-associated 152 piece of content.

For example, in response to user 46 associating 154 tag "Milestone" with content "c:\report.doc" within activity "Tradeshow", tagging process 10 (alone or in combination with activity server application 20/activity client application 22) may execute 156 the appropriate processes on content "c:\report.doc". As discussed above and in this example, user 46 associated discrete process "Email Leader" with tag "Milestone" Further and as discussed above, process "Email Leader" may be a predefined process that provides (via email) a copy of any activity content to which the tag "Milestone" is applied.

As "Susan Smith" is described in the above-stated example as the activity leader, upon user 46 associating 154 tag "Milestone" with content "c:\report.doc" (within activity "Tradeshow"), tagging process 10 (alone or in combination with activity server application 20/activity client application 22) may execute 156 process "Email Leader", which may result in a copy of content "c:\report.doc" being sent (via email) to "Susan Smith" at Susan.Smith@CompanyX.com.

As discussed above, tags may be user-defined tags (See FIG. 2) or may be predefined (i.e., semantic) tags. Accordingly, the above-described process of associating 154 a tag with content and executing 156 the process associated with the tag (on the content) is applicable to both user-defined tags and predefined tags.

Tagging process 10 (alone or in combination with activity server application 20/activity client application 22) may allow e.g., user 46 to add 158 one or more supplemental tags to the tags previously-defined for an activity (in a manner similar to that described above). When adding 158 a supplemental tag, user 46 may associate 160 a discrete process with the supplemental tag added 158. The discrete process associated 160 with the supplemental tag may be executable on the activity content with which the supplement tag is associated 154 (in a manner similar to that described above).

Figure 5:
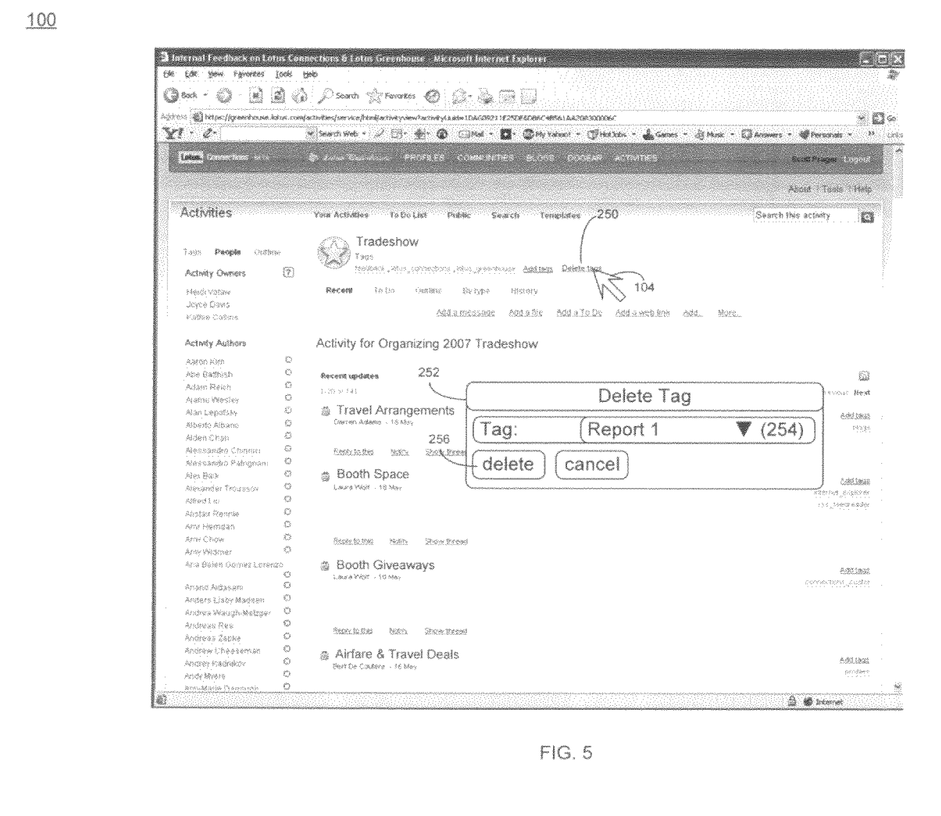
FIG. 5 is a diagrammatic view of a display screen rendered by the tagging process, activity server application and/or activity client application of FIG. 1.

Referring also to FIG. 5, tagging process 10 (alone or in combination with activity server application 20/activity client application 22) may allow user 46 to delete 162 one or more tags from the tags previously-defined for an activity. For example, user 46 may select "Delete tag" link 250 using onscreen pointer 104, which may result in tagging process 10 (alone or in combination with activity server application 20/activity client application 22) generating popup menu 252. Popup menu 252 may include a "Tag" field 254 that allows user 46 to define the tag to be deleted. Field 254 may include a dropdown menu (not shown) that allows e.g., user 46 a select a tag from a plurality previously-defined tags. Once field 254 is populated, user 46 may select "delete" button 256 using e.g., onscreen pointer 104, resulting in e.g., tag "Report 1" being deleted 162.

While server computer 12 is illustrated in FIG. 1 as a single device, this is for illustrative purposes only, as other configurations are possible and are considered to be within the scope of this disclosure. As discussed above, examples of server computer 12 may include, but are not limited to: a personal computer, a server computer, a series of server computers, a mini computer, and a mainframe computer.

For illustrative purposes, server computer 12 may represent a plurality of server computers including but not limited to one or more resource servers. The resource server (e.g., a Domino™ server) may be a server computer that stores and regulates access to the above-described resources. The same resource server (or a separate resource server) may also execute a content management system (e.g., Documentum™) that stores and regulates access to the above-described content that is shared amongst the members of an activity.

A number of implementations have been described. Nevertheless, it will be understood that various modifications may be made. Accordingly, other implementations are within the scope of the following claims.

What is claimed is:

1. A method comprising:
   defining a plurality of tags, each of which is associated with at least one of a plurality of predefined discrete processes executable on activity content including receiving a user selection of the at least of one of a plurality of predefined discrete processes from a process list to be executed on the activity content;
   associating at least one of the plurality of tags with a piece of content within an activity, thus defining one or more associated tags;
   in response to associating at least one of the plurality of tags with the piece of content within the activity, executing the at least one of the plurality of predefined discrete processes associated with the one or more associated tags on the piece of content within the activity;
   adding one or more supplemental tags to the plurality of tags; and
   deleting one or more of the plurality of tags.

2. The method of claim 1 wherein the tags are semantic tags.

3. The method of claim 1 wherein the tags include metadata.

4. The method of claim 1 further comprising:
   associating the piece of content with the activity.

5. The method of claim 4 wherein associating the piece of content with the activity initiates associating at least one of the plurality of tags with the piece of content within the activity.

6. The method of claim 1 wherein the tags are chosen from the group consisting of: milestone tags, input tags, output tags, reporting tags, storage tags, backup tags, notification tags, deadline tags, and critical tags.

7. The method of claim 1 further comprising: associating a discrete process executable on activity content with each of the one or more supplemental tags.

8. A computer program product residing on a non-transitory computer readable medium having a plurality of instructions stored thereon which, when executed by a processor, cause the processor to perform operations comprising:
   defining a plurality of tags, each of which is associated with at least one of a plurality of predefined discrete processes executable on activity content including receiving a user selection of the at least of one of a plurality of predefined discrete processes from a process list to be executed on the activity content;
   associating at least one of the plurality of tags with a piece of content within an activity, thus defining one or more associated tags;
   in response to associating at least one of the plurality of tags with the piece of content within the activity, executing the at least one of the plurality of predefined discrete processes associated with the one or more associated tags on the piece of content within the activity;

adding one or more supplemental tags to the plurality of tags; and deleting one or more of the plurality of tags.

9. The computer program product of claim 8 wherein the tags are semantic tags.

10. The computer program product of claim 8 wherein the tags include metadata.

11. The computer program product of claim 8 further comprising instructions for:

associating the piece of content with the activity.

12. The computer program product of claim 11 wherein associating the piece of content with the activity initiates associating at least one of the plurality of tags with the piece of content within the activity.

13. The computer program product of claim 8 wherein the tags are chosen from the group consisting of: milestone tags, input tags, output tags, reporting tags, storage tags, backup tags, notification tags, deadline tags, and critical tags.

14. The computer program product of claim 8 further comprising instructions for:

associating a discrete process executable on activity content with each of the one or more supplemental tags.

15. A method comprising:

defining a plurality of tags, each of which is associated with a selectable discrete process executable on activity content including receiving a user selection of the selectable discrete process from a list to be executed on the activity content;

associating at least one of the plurality of tags with a piece of content within an activity, thus defining one or more associated tags;

in response to associating at least one of the plurality of tags with the piece of content within the activity, executing the at least one of the plurality of predefined discrete processes associated with the one or more associated tags on the piece of content within the activity;

adding one or more supplemental tags to the plurality of tags; and deleting one or more of the plurality of tags.

16. The method of claim 15, wherein the selectable discrete process executable on the activity content is selectable from a plurality of predefined discrete processes.

\* \* \* \* \*